United States Patent [19]

Takamatsu et al.

[11] Patent Number: 5,950,361
[45] Date of Patent: Sep. 14, 1999

[54] PLANT ACTIVATING METHOD

[75] Inventors: Kuniaki Takamatsu, 55, Takamatsu, Kaminoyama, Yamagata 999-31; Toyoko Ohara, Nara; Hideaki Kikuchi, Osaka; Kenichi Umeda, Kamoto-gun, all of Japan

[73] Assignees: Kuniaki Takamatsu, Yamagata; Nariko Ohara, Nara; Yoshiaki Ito, Aichi; all of Japan

[21] Appl. No.: 09/007,965

[22] Filed: Jan. 16, 1998

Related U.S. Application Data

[62] Division of application No. 08/670,708, Jun. 26, 1996, abandoned.

[30] Foreign Application Priority Data

Jun. 26, 1995 [JP] Japan .................................. 7-159423
Nov. 30, 1995 [JP] Japan .................................. 7-313111

[51] Int. Cl.$^6$ .................................................. C05D 1/00
[52] U.S. Cl. ............................. 47/58.1; 47/1.01; 71/62; 504/187
[58] Field of Search ................................. 47/58.1, 1.01; 71/62; 504/187

Primary Examiner—Leon B. Lankford, Jr.
Attorney, Agent, or Firm—Darby & Darby

[57] ABSTRACT

A plant activator which is strip-shaped, and includes a silicon layer provided on one or both surfaces of the base sheet or within a base sheet and containing Si or $SiO_x$ ($0<X<2$) as a main component, wherein the silicon layer is provided by vapor-deposition or bonded by an adhesive. The plant activator is hung on or near the plants.

16 Claims, 5 Drawing Sheets

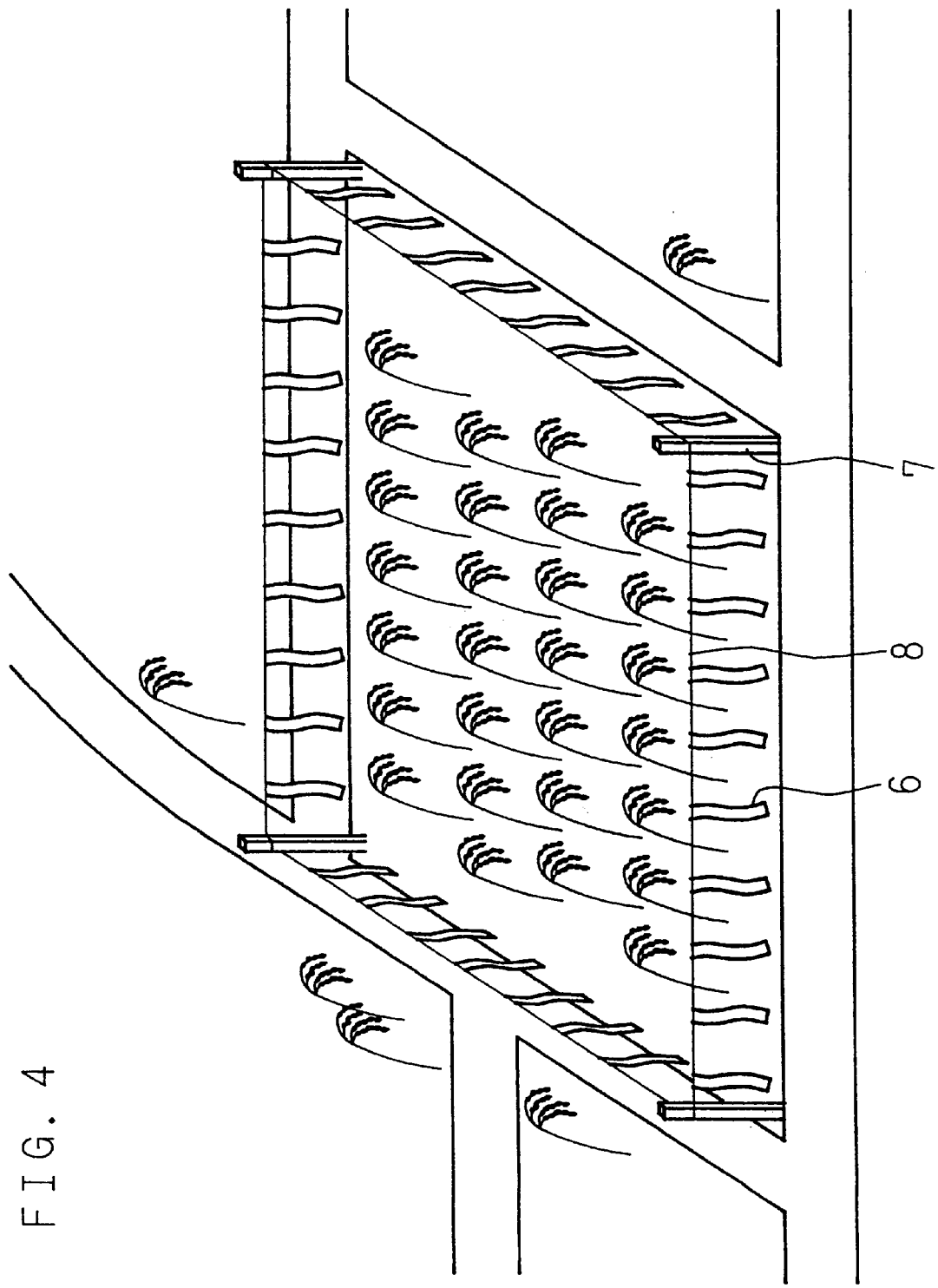

PLANT ACTIVATING METHOD

This is a division of application Ser. No. 08/670,708, filed Jun. 26, 1996 now abandoned. Each of these prior applications is hereby incorporated herein by reference, in its entirety.

BACKGROUND OF THE INVENTION

1. Field of the Invention

The present invention relates to a plant activator for promoting the growth of plants and reducing damage due to pest and insects, and a method of activating plants to promote their growth and resistance to pests and insects by the use of the plant activator.

2. Description of Related Art

The electric potential in the atmosphere changes with conditions of the weather and ground surface. For example, the passage of a cold front or an atmospheric depression increases the number of cations on the ground surface. Localities susceptible to reversing winds or swirls have a high concentration of cations which slows down the growth of plants, and as a result, the plants become less resistant to pest insects and are increasingly damaged. When a pillar-shaped structure is present straight on the ground, a conical space spreads from the top of the structure toward the ground, and the electric potential difference within the conical space increases in a diagonal direction to form a potential gradient. This conical space has such a high concentration of anions as to promote the growth of plants.

There are many other factors which influence the concentrations of anions and cations. One of the factors is static electricity. A positive static electricity area has a high concentration of cations, whereas a negative static electricity area has a high concentration of anions. When a static electricity of approximately (+) 0.2–0.3 kV in the atmosphere is removed or converted into a negative one, the good growth of plants becomes better.

There are many methods known in the prior art to remove the static electricity; for example, to drain the charge through an earth wire, to neutralize the charge with the supply of ions having an opposite polarity by a de-electrifier utilizing an isotope or A.C. corona discharge, or to discharge the charge into the atmosphere.

However, these known methods cannot completely remove the static electricity which is harmful to the growth of plants, and if the positive static electricity is to be converted to negative, it of course requires a large-scale apparatus (such as a generator of anions, etc.).

SUMMARY OF THE INVENTION

The present invention has been made to solve the problems pointed out above, and a principal object of the invention is to provide a plant activator capable of activating plants when simply hung on or near plants, and a method of activating plants by the use of the plant activator.

A plant activator according to the present invention is strip-shaped, and includes a silicon layer provided on either or both surfaces of a base sheet, wherein the silicon layer contains Si or $SiO_X$ (0<X<2) as a main component.

According to another aspect of the present invention, a plant activator is strip-shaped, and includes a silicon layer provided within a base sheet, wherein the silicon layer contains Si or $SiO_X$ (0<X<2) as a main component.

Preferably, the silicon layer is formed by vapor-deposition of Si or $SiO_X$ (0<X<2).

Preferably, the silicon layer is bonded to the base sheets by an adhesive.

According to a further aspect of the present invention, a plant activator is a strip-shaped entity constituted of Si, $SiO_x$ (0<X<2), or a substance containing Si or $SiO_X$.

A method of activating plants according to the present invention includes the step of hanging the above-mentioned plant activators on plants.

According to another aspect of the plant activating method of the present invention, the plant activators, described above are hung near plants.

In general, the atmosphere charged with the positive static electricity has a high concentration of cations, where the growth of plants is slowed down. The present invention can convert the positive static electricity into negative one, thereby increasing the quantity of anions near the plants. The anions promote the growth of plants and decrease damage due to pest insects.

Good results are gained when the value of x is $SiO_x$ is in a range of 1 to 1.95, among which the best result is obtained when it is 1.5. In addition, it is preferred that the plant activator is negatively ionized, and the more ionized it is, the greater effects are obtained.

The above and further objects and features of the invention will more fully be apparent from the following detailed description with the accompanying drawings.

BRIEF DESCRIPTION OF THE DRAWINGS

FIG. 4 is an explanatory view illustrating a manner of hanging the plant activators according to the present invention in the periphery of a paddy field.

DESCRIPTION OF THE PREFERRED EMBODIMENTS

Figure 1A:
FIG. 1A is an explanatory view illustrating an example of directly hanging a plant activator according to the present invention.
Figure 1B:
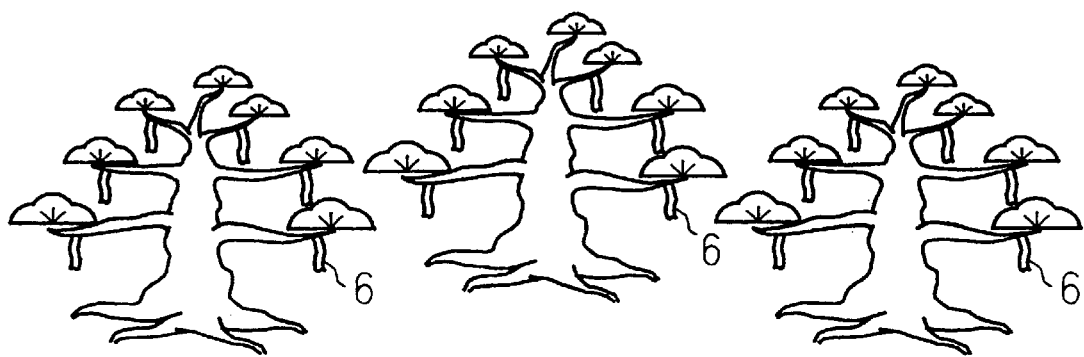
FIG. 1B is an explanatory view illustrating another example of directly hanging the plant activator according to the present invention.

The present invention will be described more particularly by way of example with reference to the accompanying drawings:

FIGS. 1A and 1B are explanatory views illustrating a state in which plant activators of the present invention are hung directly to plants. FIG. 1A shows an example in which the plant activators are applied to fruit trees in an orchard, and FIG. 1B shows an example in which the plant activators are applied to pine trees. The plant activators 6 are hung on branches of the trees by strings, wires, etc. or directly tied to the branches. The plant activator can be shaped in various forms, e.g., a rectangular strip, ribbon and the like. It is possible to bundle a plurality of plant activators 6. The important thing is that the plant activator 6 is set in such a manner as to swing or wave in wind. The size, number and hanging place of plant activators can be appropriately selected.

Figure 2A:
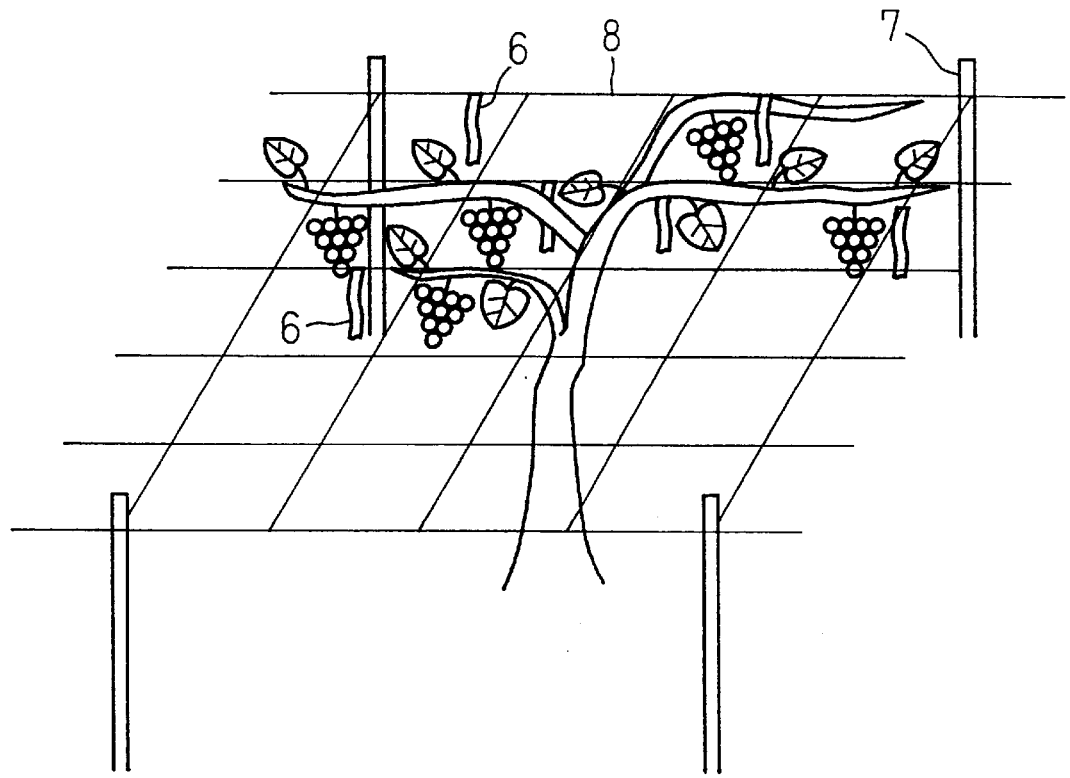
FIG. 2A is an explanatory view illustrating an example of indirectly hanging a plant activator according to the present invention.
Figure 2B:
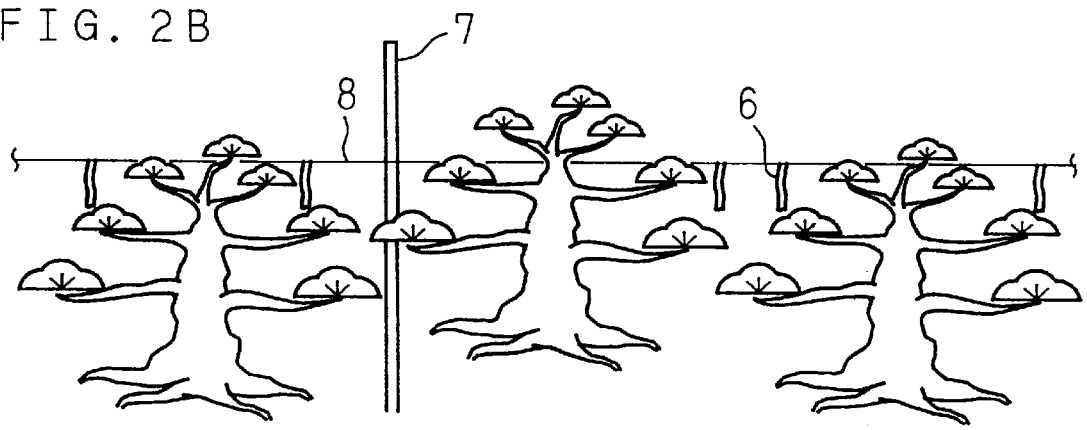
FIG. 2B is an explanatory view illustrating another example of indirectly hanging the plant activator according to the present invention.

FIGS. 2A and 2B are explanatory views illustrating a state in which the plant activators 6 are hung in the vicinity of the plant. FIG. 2A shows an example in which the plant activators 6 are applied to fruit trees in an orchard, and FIG. 2B shows an example in which the plant activators are applied to pine trees. In these examples the plant activators 6 are not only directly fitted to the plant, but tied up to wires 8 stretched between posts 7 erected in the vicinity of the plant. For instance, the plant activators 6 may be fastened to a shelf used in a vineyard or the like, whereby no special support such as the posts 7 for binding the plant activators are required. In this way, when the plant activators are set to surround the plant, the same effects result.

FIGS. 3A to 3H are cross-sections showing the plant activator 6 on an enlarged scale. The plant activator 6 shown in FIG. 3A includes a base sheet 1 (0.005–15 mm thick) of vinyl chloride, polyethylene, PET, (polyethylene terephthalate) or the like, on either surface of which a silicon vapor-deposited film 2 is formed by vapor-depositing Si or $SiO_x$ (0<X<2) about 100–6000 Å thick (silicon vapor deposition sheet). The plant activator of the constitution is, for example, "TECHBARRIER" (Trade Name) produced by Mitsubishi Chemical Inc. which is used as a food wrapper because of its considerably low permeability to oxygen and vapor.

Figure 3A:
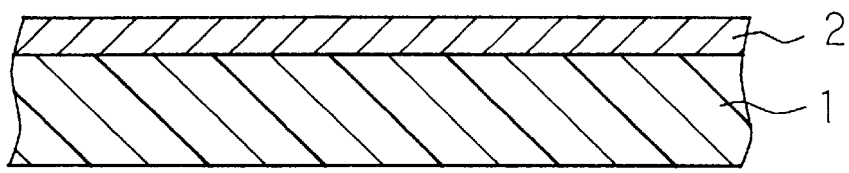
FIG. 3A is a cross-section on an enlarged scale of the plant activator according to the present invention.
Figure 3B:
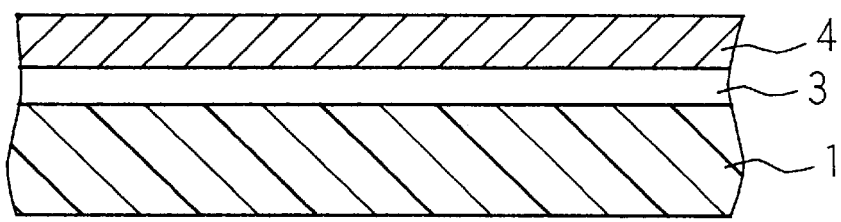
FIG. 3B is a cross-section on an enlarged scale of the plant activator according to the present invention.

FIG. 3B shows a second example of the plant activator 6 which includes the base sheet 1 (0.005–15 mm thick) of vinyl chloride, polyethylene, PET or the like, and a silicon sheet 4 (0.005–15 mm thick) of Si or $SiO_x$ (0<X<2) bonded to one of the surfaces of the base sheet 1 by a thermoplastic synthetic resin adhesive 3.

Figure 3C:
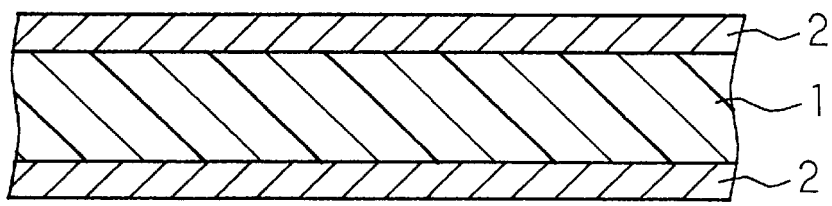
FIG. 3C is a cross-section on an enlarged scale of the plant activator according to the present invention.
Figure 3D:
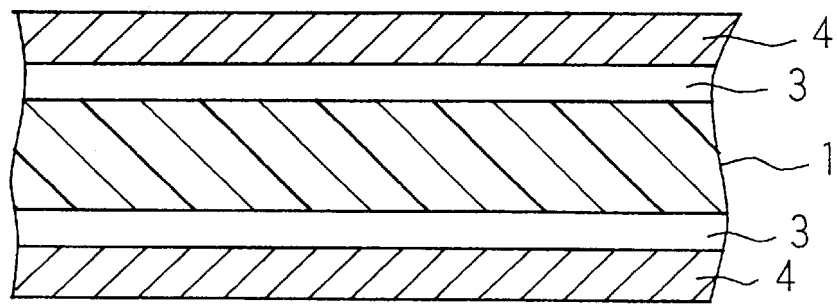
FIG. 3D is a cross-section on an enlarged scale of the plant activator according to the present invention.

FIG. 3C shows a third example of the plant activator 6 which includes the silicon vapor-deposited film 2 vapor-deposited on each surface of the base sheet 1. The silicon sheet 4 can be bonded to both surfaces of the base sheet 1 with the adhesive 3 as shown in FIG. 3D.

Figure 3E:
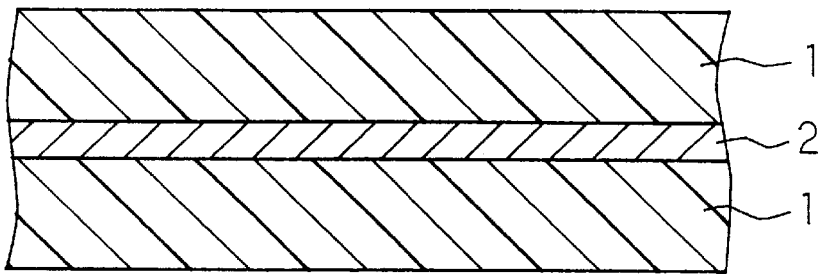
FIG. 3E is a cross-section on an enlarged scale of the plant activator according to the present invention.
Figure 3F:
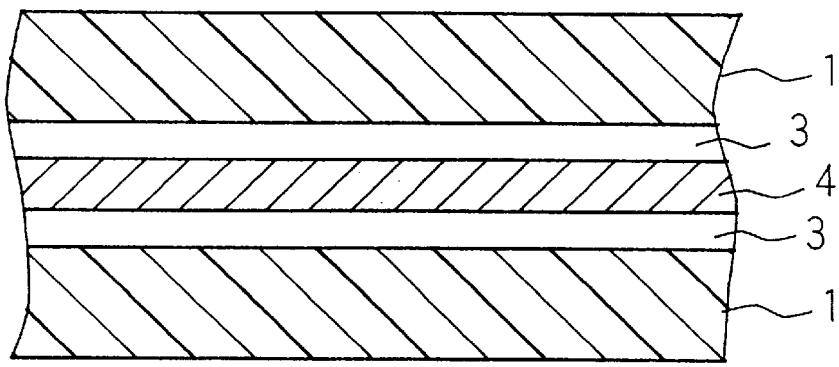
FIG. 3F is a cross-section on an enlarged scale of the plant activator according to the present invention.

FIG. 3E shows a fourth example of the plant activator 6 which includes the vapor-deposited silicon vapor-deposited film 2 held between the base sheets 1. Alternatively, the silicon sheet 4 may be held between the base sheets 1 via the adhesive 3 by the base sheet 1 or may be provided inside the base sheet 1 with the adhesive 3, as shown in FIG. 3F.

Figure 3G:
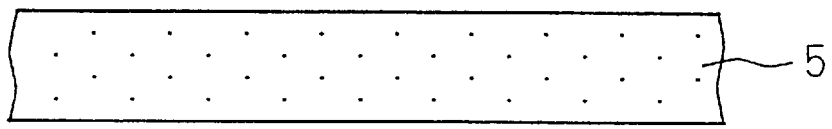
FIG. 3G is a cross-section on an enlarged scale of the plant activator according to the present invention.

FIG. 3G shows a fifth example of the plant activator 6 which is a silicon mixed sheet 5 made of a mixture of a constituent substance of the base sheet 1 and Si or $SiO_x$ (0<X<2). The mixing ratio of Si or $SiO_x$ to the constituent substance is selected in a range of 7 to 92% depending upon the using purpose of the plant activator to obtain required thickness, strength, elasticity and light permeability. Alternatively, the silicon mixed sheet 5 can be made of silicone resin.

Figure 3H:
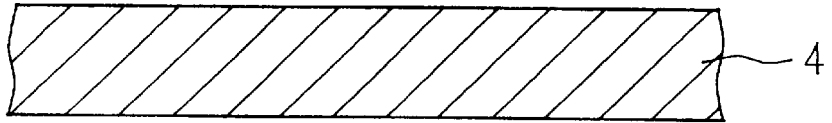
FIG. 3H is a cross-section on an enlarged scale of the plant activator according to the present invention.

The plant activator 6 can be formed solely of the silicon sheet 4 (FIG. 3H).

When the plant activator 6 was applied to an orchard, the following effects were achieved.

The static electricity was measured in both cases when the plant activator 6 was used, and when the plant activator was not used. Nearly 60 plant activators 6 (silicon vapor deposition sheets) having a size of 100 cm×10 cm were hung on each cherry tree of a height of approximately 4–5 m. The static electricity was measured by an electrostatic voltmeter (manufactured by Kasuga Denki, Model KSD-0102).

When the plant activators 6 were not used, the static electricity in the periphery of the cherry trees was (+) 0.50 kV, whereas when the plant activators 6 of the present invention were used, the static electricity was converted to (−) 0.55 kV or so.

When the plant activators 6 were used, the trees were found to have deep green leaves in a more lively appearance, and to grow more rapidly than when the plant activators were not used, whereby the cherries ripen in a shorter period of time. In addition, the harvested fruit (cherries) tasted sweeter and less sour than otherwise. A high yield of good quality cherries was achieved. Furthermore, few trees were damaged by pest insects. As a result, the yield of cherries increased. A further advantage was that the cherries were safe from cracks, which is a major problem in growing of cherries.

When the plant activator 6 was applied to pine trees, the following effects were achieved.

The static electricity was measured when the plant activator 6 was used, and when the plant activator was not used. Approximately 55 plant activators 6 (silicon vapor deposition sheets) having a size of 100 cm×10 cm were hung on each pine tree of about 5 m height.

When the plant activators 6 were not used, the static electricity in the neighborhood of the pine trees was (+) 5.63 kV, whereas when the plant activators 6 of the present invention were hung, the static electricity was converted to negative, specifically, about (−) 5.37 kV.

When the plant activators 6 were used, the trees were found to be enlivened and safe from pine worms and any other pest insects, which are a major problem with pine trees. When the plant activators 6 were used in a particular pine forest with a lot of withering pine trees, it was found that the plant activators 6 prevented or avoided the withering to allow the pine trees to regain life.

When the plant activator 6 was applied to a paddy field, the following effects were achieved.

FIG. 4 is an explanatory view illustrating a state in which the plant activators of the invention were hung in the periphery of the paddy field. More particularly, the plant activators 6 were hung on wires 8 stretched between posts 7 erected in the periphery of a paddy field of about 10,000 m² located in Mie prefecture, Japan. The plant activators 6 (silicon vapor deposition sheets) having a size of 100 cm×10 cm were hung on the wires 8 at an interval of 75 cm, and were left for about three weeks as they were.

The rice produced from this paddy field and that produced by a conventional cultivating method were subjected to palatability analysis by a near-infrared Nireko Model analyzer. The calculating equation was as follows:

$$S = constant \times Mg\ composite/(K\ composite \times T.\ N)$$

Supposing that the palatability of a high quality rice "koshihikari" produced in Niigata prefecture (Minami Uonuma) in a particular year is 100, that of the rice produced in the tested paddy field was 97.9 whereas the rice produced in other areas in Mie had a palatability of about 80. Although no plant activator 6 was used in paddy fields adjacent to the tested paddy field, the rice produced there also had as high a palatability as 95.3 under the influence of the neighboring plant activators 6 used in the tested paddy field.

In addition, the rice produced in the tested paddy field with the use of the plant activators of the invention was found to have a glossy and beautiful milky appearance in comparison with the rice produced generally in Mie prefecture. It was demonstrated after the actual eating of the rice that the taste and flavor of the rice produced in the tested paddy field were better than those of the rice ordinarily produced in Mie prefecture.

The good results were obtained when the value of x in $SiO_x$ fell in a range of 1 to 1.95, and the best result was obtained when it was 1.5. The plant activator is preferably negatively ionized, and the more ionized it is, the greater effects described above are obtained.

The constituent substance of the base sheet 1 is not limited to those described above. It is also possible to select a suitable thickness for each of the base sheet 1, silicon vapor-deposited film 2, and silicon sheet 4.

In the foregoing description the plant activator of the present invention is applied to cherry trees, grapevines, pine trees and rice plants, but the activator can be applied to any other plants.

The plant activator according to the present invention converts the positive static electricity to negative one, thereby increasing the concentration of anions in the atmosphere surrounding the plants. Therefore, when the plant activators of the present invention are hung for plants, the activators promote the growth of the plants and lessen damage due to pest insects, without using insecticides, and a large-scale apparatus.

As this invention may be embodied in several forms without departing from the spirit of essential characteristics thereof, the present embodiments are therefore illustrated and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of activating a plant comprising hanging proximate the plant, at a sufficiently close distance to activate the plant, a plant activator comprising a silicon layer provided on at least one surface of a base sheet and containing one of Si and $SiO_x$ (0<X<2), the plant activator being strip-shaped and including means for enabling mounting of the activator proximate a plant.

2. The method of claim 1, wherein the silicon layer is provided by vapor-deposition of Si or $SiO_x$ (0<X<2).

3. The method of claim 1, wherein the silicon layer is bonded to the base sheet by an adhesive.

4. The method of claim 1, wherein the silicon layer is provided inside the base sheet.

5. The method of claim 1, wherein the silicon layer is provided by vapor-deposition of Si or $SiO_x$ (0<X<2).

6. The method of claim 1, wherein the silicon layer is bonded to the base sheet by an adhesive.

7. The method of claim 1 wherein the silicon layer comprises a substance containing one of Si and $SiO_x$ (0<X<2).

8. The method of claim 1 wherein the plant activator is negatively ionized.

9. The method in accordance with claim 1 wherein the plant activator is hung on the plant.

10. The method in accordance with claim 2 wherein the plant activator is hung on the plant.

11. The method in accordance with claim 3 wherein the plant activator is hung on the plant.

12. The method in accordance with claim 4 wherein the plant activator is hung on the plant.

13. The method in accordance with claim 5 wherein the plant activator is hung on the plant.

14. The method in accordance with claim 6 wherein the plant activator is hung on the plant.

15. The method in accordance with claim 7 wherein the plant activator is hung on the plant.

16. The method in accordance with claim 8 wherein the plant activator is hung on the plant.

\* \* \* \* \*